Dec. 1, 1931.    E. A. NELSON    1,834,861
TIRE CARRIER
Filed Feb. 16, 1929    3 Sheets-Sheet 1
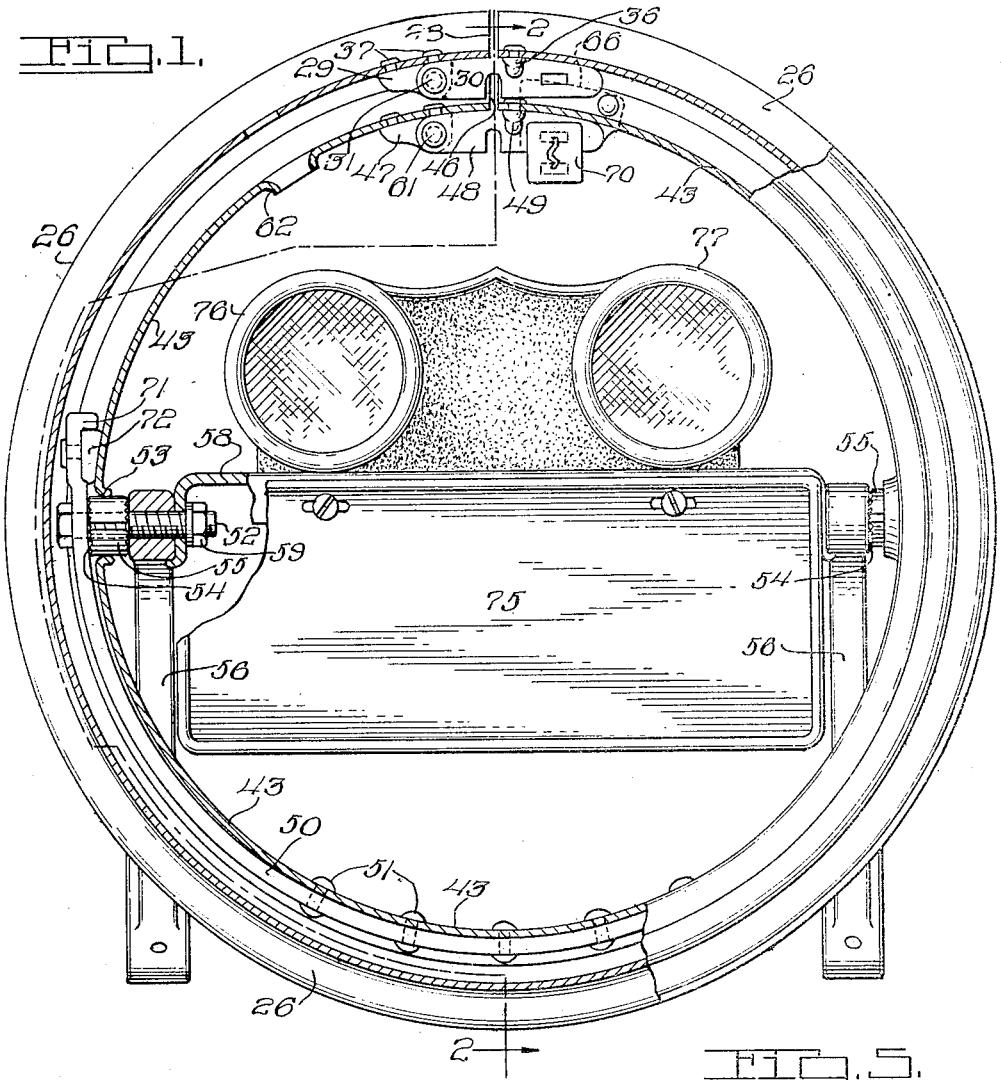
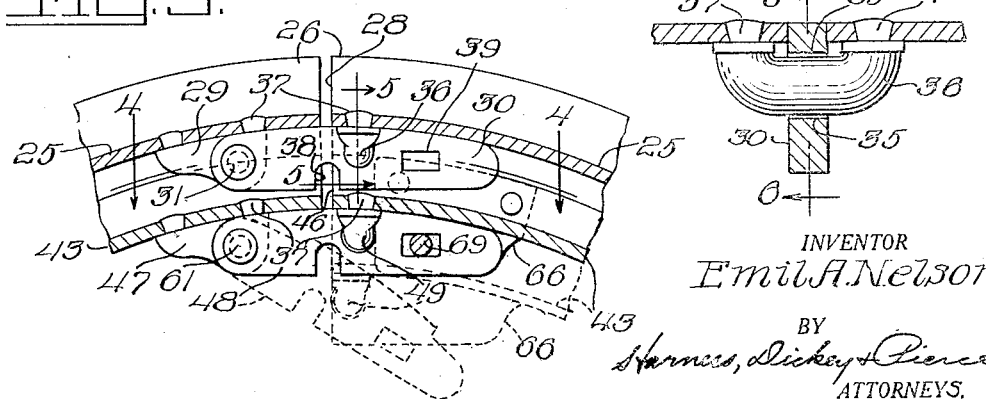
INVENTOR
*Emil A. Nelson*
BY
*Harness, Dickey & Pierce*
ATTORNEYS.

Dec. 1, 1931.  E. A. NELSON  1,834,861
TIRE CARRIER
Filed Feb. 16, 1929  3 Sheets-Sheet 2
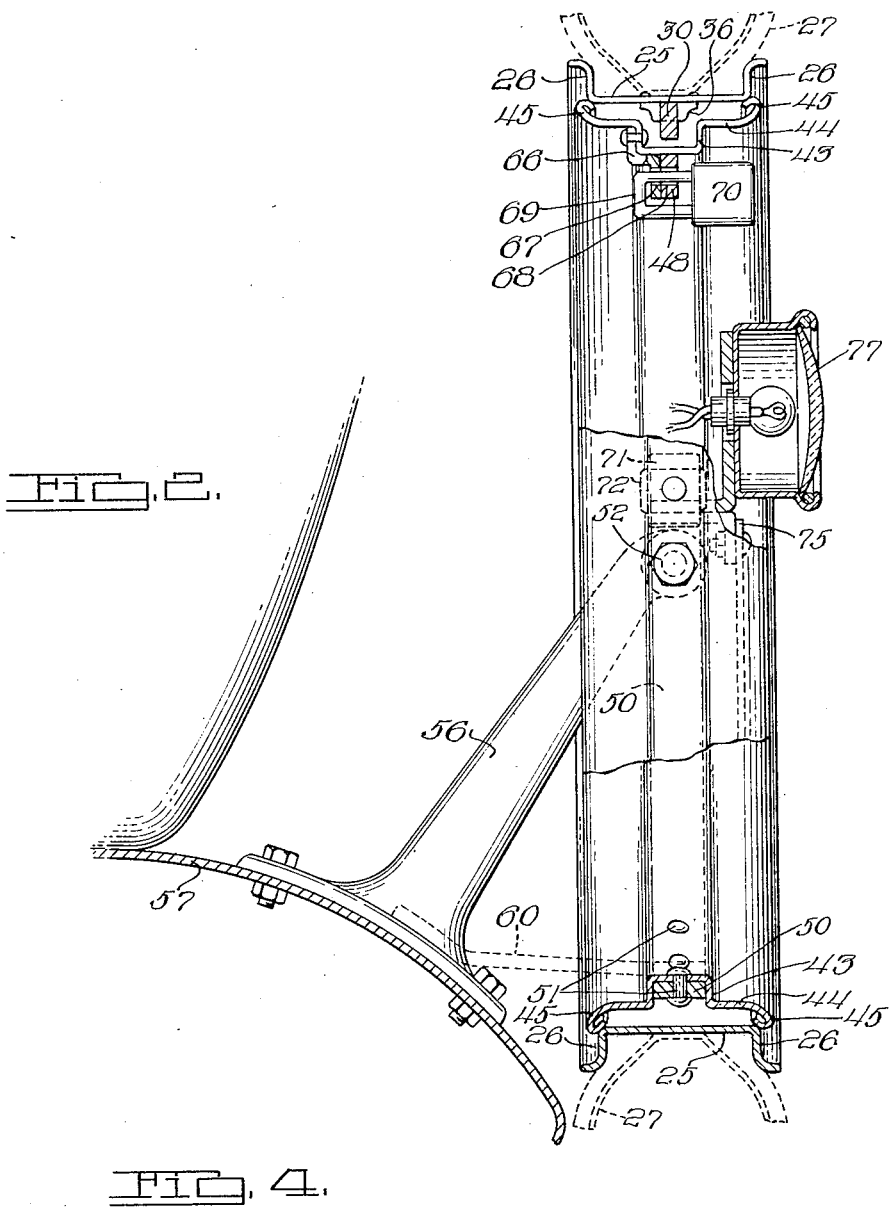
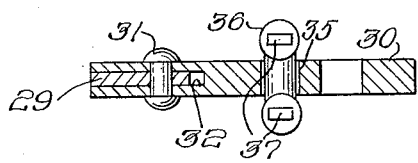
INVENTOR
*Emil A. Nelson*
BY
*Harness, Dickey & Pierce*
ATTORNEYS.

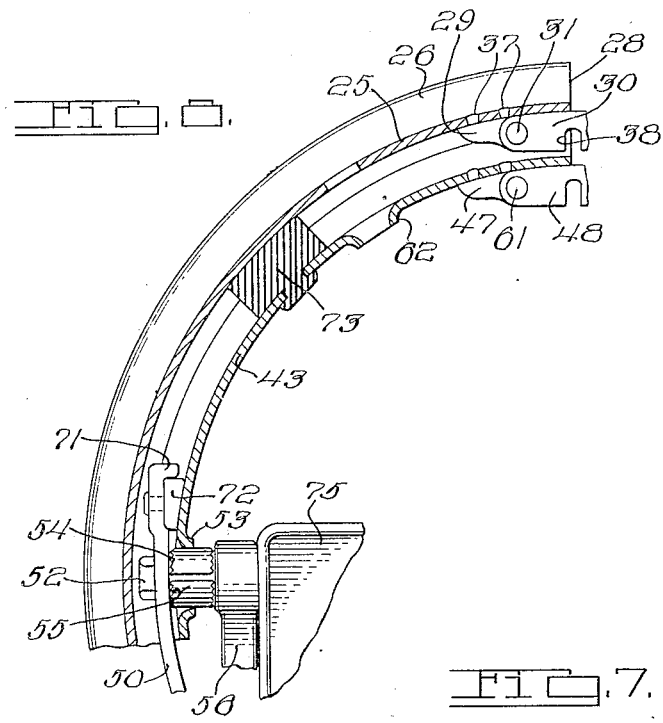
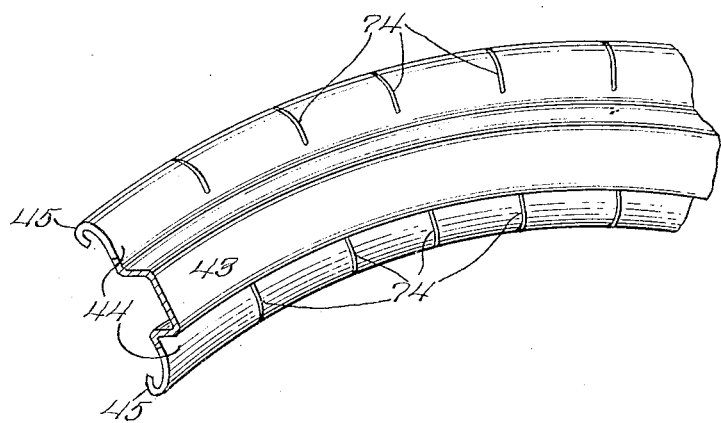
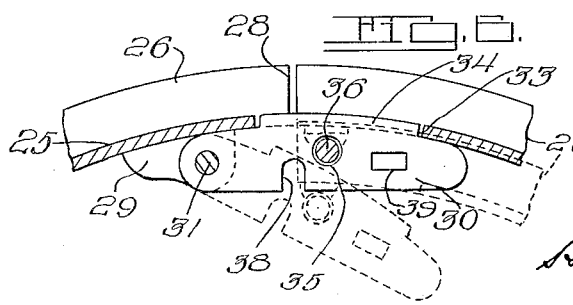

Patented Dec. 1, 1931

1,834,861

UNITED STATES PATENT OFFICE

EMIL A. NELSON, OF DETROIT, MICHIGAN

TIRE CARRIER

Application filed February 16, 1929.   Serial No. 340,478.

This invention relates to tire carriers for motor vehicles, and the like, the principal object being the provision of a novel form of tire carrier that is simple in design, economical to manufacture, and efficient in use.

Another object is to provide a tire carrier including an expansible and contractable ring upon which a tire rim is adapted to be received and to be embraced thereby.

Another object is to provide a tire carrier including an expansible and contractable ring member adapted to be received within and to be expanded against a tire rim, the weight carried by the rim being transmitted from substantially a single point thereon to suitable supporting means.

Another object is to provide a tire carrier having an expansible and contractable ring-like member and a supporting member secured thereto over a limited circumferential distance on said ring-like member whereby to permit a maximum amount of deflection of the ring member during expansion or contraction thereof.

Another object is to provide a tire carrier comprising an expansible and contractable ring-like rim receiving member provided with an inwardly extending circumferential recess, a relatively rigid supporting member being received in the recess and being secured thereto along a limited circumferential distance thereof only, the supporting member extending from the point of securement to the ring-like member to substantially opposite sides of the ring-like member and there being connected to suitable supporting arms, the supporting member engaging the sides of the recess to aid in preventing movement of the supporting ring relative to the point of securement of the ring to the supporting member.

Another object is to provide a tire carrier having an expansible and contractable ring-like supporting member in which the supporting member is of a construction similar to the rim adapted to be received thereby.

Another object is to provide a tire carrier having an expansible and contractable rim receiving member and a rigid supporting member secured thereto along a single limited area and positioned outwardly thereof, means being provided extending through the rim receiving portion at points relatively remote from the point of securement of the supporting member to the rim receiving member for securement of the supporting member to suitable supporting means, the means extending through the rim receiving portion being slidable relative thereto whereby expansion and contraction of the rim receiving portion adjacent such means is not restricted.

Another object is to provide a tire carrier comprising an expansible and contractable ring-like rim supporting member having resilient edges adapted to resiliently embrace the side edges of a rim.

A further object is to provide a tire carrier having certain novel features of construction that will be specifically pointed out, or will be obvious, in the following specification.

The above being among the objects of the present invention, the same consists in certain novel features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views;

Fig. 1 is a partially broken rear view of my improved tire carrier.

Fig. 2 is a sectional view taken on the line 2—2 of Fig. 1.

Fig. 3 is an enlarged partially broken view of the means employed for expanding and contracting the rim and the ring.

Fig. 4 is a view taken on the line 4—4 of Fig. 3.

Fig. 5 is a view taken on the line 5—5 of Fig. 3.

Fig. 6 is a view taken as on the line 6—6 of Fig. 5, showing how the locking member of the rim cooperates therewith to transmit driving effort between the wheel and rim.

Fig. 7 is a fragmentary perspective view illustrating a modified form of supporting ring.

Fig. 8 is a fragmentary sectional view illustrating a modified form of construction for resiliently holding the rim against rattling.

Referring to the drawings, I show a tire rim of the conventional split type having a cylindrical base portion 25 and side flanges 26 and being adapted to receive thereon a tire such as 27 (see Fig. 2) in the conventional manner. The rim is split as at 28 in the conventional manner to permit collapsing of the rim in order to remove the tire 27 therefrom and to place it thereon. The rim shown in the drawings is provided with a type of so-called rim lock now being manufactured in large quantities, and which rim lock is formed to aid in the collapsing and expanding of the rim during the application or removal of the tire. This rim lock comprises a bracket member 29 which is secured centrally of the rim base 25 on one side of the line of split 28 and adjacent thereto. An arm 30 is pivoted to the bracket 29 by a pin such as 31 so as to swing in a radial plane, the arm 30 being centrally slotted as at 32 in Fig. 4 so as to fit around the bracket 29. The arm 30 is of a length to bridge the line of split 28 when the rim is in normal expanded position. The base 25 of the rim is cut away as at 33 in Fig. 6 on either side of the line of split 28 and the arm 30 is provided with an upstanding tongue portion 34 which fits within the slot 33 when the rim is in normal expanded position, the outer surface of the arm 30 on either side of the tongue 34 abutting against the under face of the base 25. The arm 30 on that side thereof opposite the line of split 28 from the bracket 29 is provided with an opening 35 in which a pin 36, staked to the base 25 as at 37 on that side thereof opposite the line of split 28 from the bracket 29, is relatively rotatably received. The arm 30 is further provided with an inwardly opening slot 38 adapted to be received over a driving lug (not shown) on the wheel felloe in order to positively transmit the driving effort from the wheel to the rim, such driving effort being transmitted to the rim proper through the arm 30 and tongue 34. The arm 30 is also provided with an opening 39 adjacent its free end in which a tool (not shown) may be received in order to cause the arm 30 to pivot about the pin 31 and thereby draw the right-hand free end of the rim (as viewed in the drawings) downwardly and to the left in order to collapse the rim to permit the application or removal of a tire.

As above stated, the present tire carrier is of that type provided with a ring-like member upon which the rim above described is adapted to be supported. The ring-like member in this case is formed to approximately the same shape as the rim which it supports, it comprising a relatively narrow outwardly opening central channel portion 43 and free edges of which terminate in outwardly extending portions 44 whose edge portions are reversely bent inwardly as at 45 so as to form, in section, a relatively open loop. This ring-like supporting member is split as at 46 in the same manner as the tire rim 25, and is provided with a locking mechanism comprising the bracket 47, arm 48 and cross pin 49, corresponding exactly in construction with the bracket 29, arm 30 and pin 36 previously described. The supporting ring is so proportioned that when the tire rim is placed thereon and the supporting ring is expanded, the looped edges 45 bear against the opposite side edges of the base 25 and firmly hold the tire rim against displacement thereon. I prefer to construct the ring-like supporting member of sufficiently light springy metal that the looped edges 45 are sufficiently flexible so as to be slightly compressed upon expansion of the supporting ring against the rim. This not only maintains the tire rim in place and prevents rattling of the same, but it takes care of the small variations in tire rim sizes that are liable to occur in production.

This supporting ring is supported from a vehicle, or other device, in the following manner. Within the channel 43 I place a substantially semi-circular bar 50 of relatively rigid construction. As indicated in Fig. 2, this bar member is of substantially the same width as the interior width of the channel 43 and preferably slidably engages the sides thereof. The member 50 is preferably of substantially the same radius as the radius of the channel portion 43 when the supporting ring is in expanded position, at which time it preferably lies in contact, or almost in contact, with the bottom of the channel 43. This supporting bar 50 is secured to the supporting ring by riveting it as at 51, or otherwise securing it to the bottom of the channel 43 for a limited length only.

At diametrically opposite points, and preferably at equal distances from the point of securement to the supporting ring, the bar 50 is provided with radially extending bolts 52 which project inwardly therefrom through flanged openings 53 in the bottom of the channel 43. The inner face of the bar 50 at such points is preferably provided with a knurled or serrated surface 54 and a collar 55 having knurled or serrated end surfaces, is received over each bolt 52 and against the corresponding face 54, it being of a size to be slidably received within the corresponding opening 53. The bolts 52 inwardly of the collar 55 are adapted to be secured to any suitable supporting members or means secured to or forming a part of the vehicle or other device upon which the tire carrier is to be mounted, that shown comprising a pair of rigid arms 56 which may be suitably secured to a conventional form of frame cross member 57, as indicated in Fig. 2, when the tire carrier is adapted to be carried at the rear of the vehicle, the bolts 52 engaging the free ends of the arms. The arms 56 themselves, as well as the free ends of the bar 50, may be stiffened if desired, by positioning a cross member such as 58 between them, as indicated in Fig. 1, and drawing the ends thereof securely against the corresponding end of the arm 56 by the nuts 59 threaded on the bolts 52. This acts to maintain the free ends of the arms 56 and the free ends of the bar 50 in their rigid spaced relationship. The outer faces of the arms 56 where they engage the inner faces of the sleeves 55 are, of course, knurled or serrated for matching engagement with the contacting end of the sleeves 55. The provision of the sleeve 55 and the serrated faces is for the purpose of permitting adjustment of the angularity of the tire carrier about the axis of the bolts 52, and this is preferable where a single design of tire carrier is to be employed on various makes of vehicles, or various models of a single make where different angularities are required in order to blend the tire carrier into the lines of the body, but it will be apparent that where such adjustability is not required, the sleeve 55 may be formed as an integral part either of the bar 50, or of the corresponding arm 56. In such a case the connection between the arms 56 and the bar 50 may be of any suitable locking type, preventing rotatable movement of one relative to the other about the axis of the bolts 52, or such locking joint may be dispensed with and a third arm such as 60, indicated by dotted lines in Fig. 2, may be extended from that portion of the channel 43 to which the bar 50 is riveted to the frame cross member 57 between the arms 56.

It may also be noted that where the sleeve or washer 55 is of hardened construction, and the bar member 50 and arms 56 are not hardened, no initial knurling or serrating of the bar or arms is necessary as the knurling or serrations of the sleeves 55 will be forced into the contacting surfaces of the bar and arms when the nuts 59 are drawn up.

When it is desired to remove a rim from or to apply a rim to the tire carrier, the arm 48 is turned about the axis on its pin 61 so as to move the free ends of the ring-like supporting member into over-lapped and collapsed position, which thereby sufficiently reduces its maximum outside diameter as to allow such removal or application. During such collapsing of the supporting ring member, due to the fact that the bar 50 is secured to the supporting member over a limited length only thereof, and because the sleeves 55 are freely slidable in the openings 53, the ring-like supporting member is free to flex over substantially its entire circumference. This permits a minimum expenditure of energy in contracting the supporting ring, and prevents any excessive stresses being set up in the same.

The bar 50, although being secured to the ring-like supporting member at substantially one point only, nevertheless maintains it against vibration or movement longitudinally of the vehicle because of the fact that it engages the side surfaces of the channel portion 43 for at least half of the circumference thereof.

It will, of course, be evident that the bracket 29 and arm 30 of the tire rim are received within the channel 43 of the supporting ring when positioned thereon, and are thereby concealed when the rim is positioned on the ring. Rotatable movement of the rim on the ring is of course prevented, when a tire is mounted on the rim, because of the fact that the valve stem (not shown) projects through the opening 62 provided in the bottom of the channel 43 for that purpose. The arm 48 may be locked against movement for the purpose of preventing removal of the rim from the carrier in any suitable manner. One method of doing this is indicated in the drawing, and comprises a bracket member 66, riveted or otherwise secured to the side of the channel 43 of the ring member adjacent the free end of the arm 48, and extending into adjacent relationship therewith when the arm 48 is moved to expand the ring. Aligned openings 67 and 68 are provided in the bracket 66 and arm 48 whereby the hasp 69 of a pad-lock 70 may be inserted through them.

In order to prevent possible rattling between the bar 50 and the supporting ring when the carrier is in operation, I prefer to extend the free ends of the bar 50 upwardly as at 71 and secure thereto a rubber block such as 72, the block being of such dimensions that when the supporting ring is expanded the block 72 is placed under compression and thereby acts to hold the free ends of the bar 50 in a definite relationship with respect to the adjacent portion of the supporting ring at such ends.

In cases where the supporting ring is formed of material of such thickness as to provide very little, or substantially no resiliency at the looped edges 45, thereby necessitating the diameter of the ring-like supporting member being limited to closely fit a rim of minimum diameter, and which would otherwise allow a rim of larger diameter to rattle upon the supporting ring, I prefer to provide additional means for preventing such rattling. This may take the form indicated in Fig. 8 in which one or more rubber blocks 73 are secured within the channel 43 between the block 72 and the split portion of the rim and ring, the rubber blocks 73 being of such dimensions as to be compressed between the bottom 25 of the rim and the bottom of the channel 43 when the ring is expanded.

Another method of overcoming this disadvantage of using heavier gauge material is indicated in Fig. 7. This method comprises slotting the portions 44 and 45 of the supporting ring as at 74 in Fig. 7. This slotting acts to form the sides of the supporting ring into a plurality of independently movable resilient fingers which are adapted to give when the ring is expanded against the rim. This construction permits the ring to be made of a diameter to take all normal variations of a given size of rim.

With this construction, the stiffening bar 58 may be employed as a supporting means for a license plate such as 75 and signal lights 76 and 77, as indicated in the drawings, or for other objects as desired.

It will of course be obvious that it is not essential in the practice of the present invention that the bar 50 be positioned at the bottom of the tire carrier, but may be placed in any other position, such as at the top of the carrier or side thereof if desired, and it is further apparent that the point of securement of the bar 50 to the supporting ring need not be equally disposed on either side of the line of split of the supporting ring or rim.

It will be obvious that the construction of the tire carrier herein described is such as to permit easy and economical production of the same, inasmuch as the ring-like supporting member may be produced by the same machinery, or substantially the same, as is employed for forming the tire rim itself.

Although I have shown a particular type of rim lock and expanding and contracting means for the supporting ring, it will be evident that the particular type of rim lock, whether it permits ease in expanding and contracting of the rim as in the construction shown, or not, is of no moment as far as the present invention is concerned, nor is it necessary that the particular means shown for expanding and contracting the supporting ring itself be employed, as it is obvious that any suitable means may be employed for accomplishing this movement, the construction described being shown merely for the purpose of illustrating an exceedingly simple and economical manner of accomplishing the result desired.

These and other formal changes may be made in the specific embodiment of the invention described without departing from the spirit or substance of the broad invention, the scope of which is commensurate with the appended claims.

What I claim is:

1. In a tire carrier, in combination, an expansible and contractable rim supporting ring, and a single supporting member rigidly secured to said ring over a single limited area.

2. In a tire carrier, in combination, a rim receiving ring, and a single supporting member therefor rigidly secured thereto over a single limited area and slidably engaging said ring at a plurality of points spaced from said area.

3. In a tire carrier, in combination, a split rim receiving ring, and a single supporting member therefore secured thereto at a point substantially opposite the line of split of said ring.

4. In a tire carrier, in combination, a rim supporting ring formed to provide an outwardly opening circumferentially extending channel therein, and a generally arcuate supporting member received within said channel and rigidly secured to said ring over a limited length of said ring only.

5. In a tire carrier, in combination, a rim supporting ring formed to provide an outwardly opening circumferentially extending channel therein, and a generally arcuate supporting member received within said channel and rigidly secured midway between its ends to said ring.

6. In a tire carrier, in combination, a rim supporting ring formed to provide an outwardly opening circumferentially extending channel therein, a generally arcuate supporting member received within said channel and rigidly secured to said ring over a limited length of said ring only, and means extending through the bottom of said channel connecting the ends of said supporting member with cooperating supporting means.

7. In a tire carrier, in combination, an expansible and contractable ring having a circumferentially extending outwardly opening channel formed therein, a semi-circular rigid member received in said channel and rigidly secured thereto midway between its ends, said rigid member slidably engaging the sides of said channel, said channel being provided with an opening in its bottom wall adjacent each end of said rigid member, and studs secured to the ends of said rigid member projecting through said openings and being movable therein.

8. In a tire carrier, in combination, an expansible and contractable ring having a circumferentially extending outwardly opening channel formed therein, a semi-circular rigid member received in said channel and rigidly secured thereto midway between its ends, said rigid member slidably engaging the sides of said channel, said channel being provided with an opening in its bottom wall adjacent each end of said rigid member, studs secured to the ends of said rigid member projecting through said openings and being movable therein, and a member extending between said studs and rigidly secured relative to them.

9. In a tire carrier, in combination, an expansible and contractable ring having a circumferentially extending outwardly opening channel formed therein, a semi-circular member received therein and secured thereto between its ends, means engaging said semi-circular member adjacent its ends for supporting the same, and resilient means interposed between the ends of said semi-circular member and the bottom of said channel adapted to be compressed upon expansion of said ring.

10. In a tire carrier, in combination, a generally channel sectioned expansible and contractable ring having transversely slotted resilient edges adapted to embrace a tire rim when expanded therein.

11. In a tire carrier, in combination, an expansible and contractable ring adapted to receive a tire rim theron, said ring being formed of sheet metal into a generally channel section, the side edges of which are reversely bent to form, in section, an open loop.

12. In a tire carrier, in combination, an expansible and contractable ring adapted to receive a tire rim thereon, said ring being formed of sheet metal into a generally channel section, the side edges of which are reversely bent to form, in section, an open loop yieldable when forced into contact with a rim.

13. An expansible and contractable ring for a tire carrier formed of sheet metal into a generally channel shaped section the margins of which are reversely bent inwardly to form, in section, open loops adapted to engage the side edges of a tire rim when received thereon.

14. A rim supporting member for a tire carrier comprising an expansible and contractable ring formed of sheet metal into a generally channel shaped section, the sides of said ring being split to impart radial resiliency to said edges.

15. A rim supporting member for a tire carrier comprising an expansible and contractable ring formed of sheet metal into a generally channel shaped section, the sides of said ring being transversely split to form the same into a plurality of radially yieldable fingers.

16. In combination, a generally channel sectioned expansible and contractable ring, a rigid member received therein and rigidly secured thereto between its ends, a pair of supporting arms each terminating in spaced but adjacent relationship with respect to the inside surface of said ring, means extending freely through said ring connecting said arms with said rigid member, and means for expanding and contracting said ring.

17. In a tire carrier, in combination, a ring segment, a rim receiving ring enveloping said segment on at least three sides thereof and secured thereto, and means for supporting said rim receiving ring from a supporting surface through said segment.

EMIL A. NELSON.